United States Patent [19]

Franses et al.

[11] Patent Number: 4,743,507

[45] Date of Patent: May 10, 1988

[54] NONSPHERICAL MICROPARTICLES AND METHOD THEREFOR

[76] Inventors: Elias I. Franses, 3732 Capilano Dr.; James M. Caruthers, 1210 Western; Kathleen M. Keville, 1155 Anthrop Dr. #3, all of West Lafayette, Ind. 47906

[21] Appl. No.: 906,505

[22] Filed: Sep. 12, 1986

[51] Int. Cl.⁴ .................. B32B 5/16; B29B 9/10; B29C 55/04; B29C 55/12

[52] U.S. Cl. .................. 428/402; 264/5; 264/146; 264/236; 264/288.8; 264/290.2; 264/317; 264/322; 264/344; 264/347; 264/DIG. 44

[58] Field of Search .......... 264/49, 5, 317, 344, 264/DIG. 44, 288.8, 289.6, 236, 347, 320, 322, 290.2, 146; 428/402

[56] References Cited

U.S. PATENT DOCUMENTS

| | | | |
|---|---|---|---|
| 3,310,505 | 3/1967 | Parker | 264/344 X |
| 3,334,070 | 8/1967 | Chezaud | 264/344 X |
| 3,586,654 | 6/1971 | Lerman et al. | 264/5 X |
| 3,975,455 | 8/1976 | Falender et al. | 264/288.8 X |
| 4,182,700 | 1/1980 | Benton et al. | 264/236 X |

OTHER PUBLICATIONS

Brydson, J. A., *Plastics Materials*, Princeton, N.J., D. Van Nostrand, 1966, pp. 33–43.
Bradford and Vanderhoff, *J. Appl. Phys.*, 26, 864 (1955).
Vanderhoff et al., *J. Polym. Sci.*, 20, 255 (1956).
Hearn et al., *Adv. Colloid Interf. Sci.*, 14, 173 (1981).
Ugelstad et al., *Makromol. Chem.*, 180, 737 (1979).
Ugelstad et al., *Adv. Colloid Interf. Sci.*, 13, 101 (1980).
Zsigmondy, *Z. Physik. Chem.*, 56, 56 (1906).
Zsigmondy, *Z. Anorg. Chem.*, 99, 105 (1917).
Lamer & Barnes, *J. Colloid Sci.*, 1, 71 (1946).
Ottewill and Woodbridge, *J. Colloid Sci.*, 16, 581 (1961).
Matijevic et al., *Prog. Colloid Polym. Sci.*, 61, 24 (1976).
*Pure Appl. Chem.*, 50, 1193 (1978).
*Acc. Chem. Res.*, 14, 22 (1981).
Demchak & Matijevic, *J. Colloid Interf. Sci.*, 31, 257 (1969).
Brace and Matijevic, *J. Inorg. Nucl. Chem.*, 35, 3691 (1973).
Ogino and Kuronoma, *J. Colloid Interf. Sci.*, 56, 629 (1976).
Sutera and Mehrjardi, *Biophys. J.*, 15, 1 (1975).
Sutera and Boylan, *J. Colloid Interf. Sci.*, 73, 295 (1980).

*Primary Examiner*—Philip Anderson

[57] ABSTRACT

A method for producing nonspherical particles including those of prolate spheroidal, oblate spheroidal, and ellipsoidal shape is described. A microparticulate latex can be produced wherein the microparticles in the latex are substantially identical in all dimensions. The overall shape, volume, and aspect ratio or aspect ratios of the particles can be systematically controlled. Non-spherical particles ranging in sizes from about 0.01 microns to about 100 microns can be produced from a variety of polymeric materials. Such particles can be used as model particles for a variety of scientific studies, calibration standards for electron microscopes, and in a variety of optical, thermal, electrical, and biomedical applications.

26 Claims, 4 Drawing Sheets

NONSPHERICAL MICROPARTICLES AND METHOD THEREFOR

BACKGROUND OF THE INVENTION

1. Field of the Invention

This invention relates to the production of particles having well defined particulate shapes and sizes. More particularly, it relates to the production of nonspherical particles such as ellipsoids and spheroids, preferably monodisperse in particle dimension.

2. Description of the Prior Art

The production of spherical particles in polymer latices is well known in the art. For example, the production of monodisperse spherical polystyrene particles by emulsion polymerization was first reported by Bradford and Vanderhoff, *J. Appl. Phys.*, 26, 864 (1955) and Vanderhoff et al., *J. Polym. Sci.*, 20, 255 (1956).

A comprehensive review of the preparation and use of monodisperse polymer particles was reported by Hearn et al. in *Adv. Colloid Interf. Sci.*, 14, 173 (1981). Although monomers such as vinyl chloride, butadiene, methylmethacrylate, vinyl acetate, and isoprene have been used for preparation of polymer latices, the majority of research and development has been done with styrene.

Emulsion polymerization can be carried out in the presence or absence of added surfactants. Polymerization initiators may be free radicals produced by dissociation of peroxy and azo compounds. Alternatively, a redox system such as a persulfate/sulfite system may be employed to initiate emulsion polymerization.

Polymer particles that are spherical in shape and exceptionally monodisperse in size can be prepared by any of the numerous emulsion polymerization techniques. The diameters of the spherical microparticles produced by emulsion polymerization methods can range from 0.01 to greater than 1.0 microns. The chemical composition and surface properties of such spherical particles can be varied over a wide range.

Seeded emulsion polymerization techniques can be used to produce microspheres having larger diameters. Ugelstad et al. Makromol, Chem., 180, 737 (1979); Ugelstad et al. *Adv. Colloid Interf. Sci.*, 13, 101 (1980). Particles with diameters up to 20 microns can be easily produced by several successive seeded growth steps.

Monodisperse metal sols have been produced by techniques of homogeneous precipitation and have been prepared from a variety of elements, including gold, sulfur, selenium, and silver. Zsigmondy, *Z. Physik. Chem.*, 56, 56 (1906); Zsigmondy, *Z. Anorg. Chem.*, 99, 105 (1917); Zsigmondy & Thiessen, *Das Kalloide Gold*, Akad. Verlagsges, Liepzig (1925); Lamer & Barnes, *J. Colloid Sci.*, 1, 71 (1946); and Ottewill and Woodbridge, *J. Colloid Sci.*, 16, 581 (1961).

The need for well-characterized nonspherical particles, however, remains. Nonspherical particles produced to date include the following: inorganic sols of metal hydrous oxides, Matijevic et al., *Prog. Colloid Polym. Sci.*, 61, 24 (1976), *Pure Appl. Chem.*, 50, 1193 (1978), *Acc. Chem. Res.*, 14, 22 (1981), Demchak & Matijevic, *J. Colloid Interf. Sci.*, 31, 257 (1969), and Brace and Matijevic, *J. Inorg. Nucl. Chem.*, 35, 3691 (1973); spindle-shaped silica particles, Ogino and Kuronoma, *J. Colloid Interf. Sci.*, 56, 629 (1976); and frozen erythrocytes, Sutera and Mehrjardi, *Biophys. J.*, 15, 1 (1975). Most of these particles, however, are quite polydisperse, having complex nonspherical shapes, rough surfaces, and significant particle size variability. Little work has been done to systematically vary their surface properties. More importantly, the size and shape of particles cannot be systematically controlled and varied over a wide range.

It is, therefore an object of the present invention to produce particles having simple geometric shapes other than a sphere.

Another object of the present invention is to produce simple particles that are monodisperse both in size and shape.

It is still another object of this invention to produce microparticles having uniform prolate spheroidal, oblate spheroidal, and ellipsoidal shapes.

It is a further object of this invention to provide a process for systematically controlling microparticle size, shape, and surface properties.

SUMMARY OF THE INVENTION

It has now been discovered that well-characterized nonspherical microparticles can be produced by deforming spherical particles. Deformation of spherical microparticles is accomplished in accordance with this invention by uniaxial or biaxial deformation of a heated elastic polymer matrix in which such spherical microparticles are dispersed. The matrix polymer and the polymer for the microparticles are selected so that their elastic properties are similar and so that their chemical properties are sufficiently distinct to allow the matrix polymer to be selectively degraded or dissolved in the presence of the particle polymer material.

A dispersion of spherical polymer particles in the polymer matrix is heated to a temperature exceeding the transition temperature or the melting point of the polymer comprising the microspheres. The polymer particle/matrix composite is then deformed under uniaxial or biaxial tension at this elevated temperature to produce nonspherical microparticles. The deformation field is spatially homogeneous so that the particles produced by the method of this invention from uniform spherical particle starting materials have substantially the same size and shape.

The polymer particle/matrix composite is cooled to room temperature while constrained in the deformed state to provide nonspherical microparticles embedded in the polymer matrix. The elastic matrix surrounding the resulting particles is chemically degraded or dissolved to release the nonspherical microparticles, which are subsequently recovered.

The process of this invention, more fully described herein, is effective to convert spherical polymer particles into corresponding prolate spheroids, oblate spheroids, or ellipsoids. Other axisymmetric and nonaxisymmetric shapes can also be produced by the process of this invention. Particle size is determined by the size of the spherical polymer particles that are initially embedded in the elastic polymer matrix. When the spherical particles are monodisperse, i.e., characterized by particles of uniform size, the dimensions of the resulting nonspherical particles will also be monodisperse. Thus, the process can be executed such that all particles produced in a given batch will have substantially the same size and shape.

DETAILED DESCRIPTION OF THE INVENTION

In the practice of this invention, spheroidal, ellipsoidal, and other nonspherical polymer particles are produced having a controlled crosslink density, chemical composition, and dimensions. Such particles are produced by a multi-step process in which spherical particles of polymeric material are dispersed into a second material capable of forming an elastic matrix. The particle and matrix-forming materials are selected such that their elastic properties are similar and so that their chemical properties are sufficiently distinct to allow the matrix polymer to be selectively degraded or dissolved. The matrix-forming prepolymer, including monomers, oligomers and polymeric fluids, is subsequently polymerized to form an elastic particle/matrix composite material comprising the spherical particles embedded in an elastic polymer matrix. Alternatively, rather than a prepolymer, the matrix initially could be polymeric and crosslinked after incorporation of the spherical particles. This composite material is heated to a temperature that exceeds the glass-to-rubber transition or the melting point of the spherical particles. Axial or biaxial strains are then applied to the composite to form axisymmetric or nonaxisymmetric nonspherical particles in the extended matrix. The composite material is then cooled while maintaining the composite material in its axially extended condition. The nonspherical particles are then released by dissolving or degrading the elastic polymer matrix.

A wide variety of polymer compounds can be used as the polymer particle starting material in this invention. Although the choice of polymer starting material is not critical, the phase transition temperature, such as the glass-to-rubber transition temperature or the melting point, of the polymer particle material must be significantly greater than room temperature. Typically, a temperature differential of about 10° C. to about 20° C. will suffice. Representative polymeric compounds useful in this invention to produce nonspherical monodisperse microparticles are polystyrene, polyvinyltoluene, polyacrylonitrile, polyvinylesters, polydivinylbenzene, polyvinylalcohol, polymethylmethacrylate, and polyethylmethacrylate, in either pure or copolymer form. Magnetic polymer microparticles which are impregnated with a magnetic material can also be used. Schroder, Methods in Enzymology, 112, 116 (1986); Treleaven et al., Lancet, 1, 70 (1984). Other polymeric compounds can be effectively used to produce monodisperse microparticles as described herein, thus the invention should not be construed as being applicable to only those designated polymeric compounds. The polymeric compound can be strongly crosslinked, lightly crosslinked, or uncrosslinked. Crosslinking may occur during the actual production of the monodisperse polymeric spheres or afterwards by impregnating the microspheres with additional monomer and crosslinking agents.

The polymeric compounds employed in the present invention are readily available either commercially or through procedures which are well known among those familiar in the art. For instance, water immiscible monomers such as styrene and vinyltoluene can be used to produce polymer particles by conventional emulsion polymerization methods. These emulsion polymerization techniques can also be used for slightly water soluble monomers such as acrylonitrile and vinylesters, but cannot be used for monomers that have a high solubility in water.

For water miscible monomers, inverse emulsion polymerization is used to produce polymeric microspheres. Vanderhoff et al., Adv. Chem. Ser., 34, 32 (1962). Examples of monomers which can be polymerized in this manner to yield monodisperse microspheres include acrylic acid, acrylamide, and sodium vinylbenzene sulfonate.

Emulsion polymerizations in oil, employing a dispersion stabilizer, can also be used for water soluble and water insoluble monomers. An example of such a system is methylmethacrylate in n-heptane with a block copolymer of poly(methylmethacrylate) and poly(12-hydroxystearic acid) as a stabilizer. Cairns et al., J. Colloid Interface Sci., 54, 45 (1976).

Emulsion polymerizations can be thermally initiated but free radical initiators are more commonly used. Dissociative compounds as well as redox systems are also effective to initiate polymerization. Both water soluble and oil soluble initiators can be used, including benzoyl peroxide, potassium persulfate, hydrogen peroxide, azobis-isobutyronitrile, 4,4'-azobis-4-cyanovaleric acid, persulfate/sulfites, persulfate/metabisulfites, peroxydiphosphate/metabisulfites, and bisulfite/chlorates.

Although emulsion polymerization usually produces monodisperse particles, polydispersity does occasionally occur, particularly in seeded emulsion polymerizations. For example, polydispersity due to Ostwald ripening may occur when producing particles having a diameter larger than 2 microns. Appropriate additives can be used to stabilize the emulsion against Ostwald ripening.

Anionic, nonionic, or polymeric stabilizers are frequently needed to improve the stability of the dispersion, that is, to prevent particle agglomeration and precipitation. The type of stabilizer used depends on the type of dispersion medium used and on the chemical requirements imposed by the process. In certain cases, an acid-stable or a base-stable surfactant may be used. The stabilizer should be active in the particular medium involved and should not swell the microparticles or interact unfavorably with prepolymeric material utilized to form the elastic matrix. Suitable stabilizers are: (1) nonionic surfactants such as Igepal CA-210, CA-720, CO-520, CO-720, or T-33 from GAF, Triton BG-10 or DF-20 from Rohm and Haas, and Brij-58 or Brij-92 from I.C.I.; (2) zwitterionic surfactants such as phospholipids or AJI-VS61-19 or AJI-VS61-27 from Procter and Gamble; (3) anionic surfactants, such as Aerosol-OS, -OT, -22, or -18, from American Cyanamid, sodium or potassium soaps, sodium alkyl sulfates, sodium alkyl sulfonates, sodium alkyl aryl sulfonates, sodium alkyl ethoxysulfates, or alkyl ethoxysulfonates; (4) cationic surfactants, such as alkyltrimethylammonium halides, dialkyl dimethylammonium halides, and alkyl trimethylpyridinium halides; and (5) polymeric stabilizers, such as Silwet from Union Carbide. The surfactant concentration should generally be less than about 1 wt %, to avoid significant interactions with the matrix material.

The microspheres can also be supplemented with functional groups to enhance stability. A monomer containing the functional group can be copolymerized at the particle surface. Polymeric surfactants can also be adsorbed on or chemically attached to the surface of the microsphere. Alternatively, conventional surfactants can be modified to include a polymerizable group that reacts at the surface.

The average diameters of the particles obtained by emulsion polymerization range from about 0.01 to about 1 microns with variations in diameter of less than five percent. Larger particles of up to about 100 microns in diameter can be prepared via seeded emulsion polymerization techniques.

The resulting microspheres are subsequently transferred to either: (i) a monomeric or oligomeric prepolymer which is subsequently polymerized and crosslinked to produce an elastic matrix or (ii) a polymeric fluid material which may be subsequently crosslinked to form the matrix. To achieve this result it is convenient to commingle the dispersion of microspheres with the matrix-forming material in proportions sufficient to produce final weight fractions of microspheres in the matrix-forming material ranging from about 0.0001 to about 0.30, and preferably weight fractions ranging from about 0.0005 to about 0.15.

If the dispersion medium and the matrix-forming materials are immiscible, the microspheres tend to agglomerate at the fluid-fluid interface. It is often necessary to use an intermediate transfer solvent to execute the transfer of the particles to the matrix-forming material. The choice of an intermediate solvent depends, of course, on the transfer medium and the original dispersion solvent. Moreover, all transfer solvents must be chemically inert to the particles and must not swell the particles. Suitable intermediate solvents are methanol, ethanol, n-propanol, isopropanol, toluene, acetone, water, dimethylsulfoxide, dimethylformamide, carbon tetrachloride, cyclohexane, carbon tetrachloride, and diethylamine.

The original particle dispersion solvent is then removed from the transfer solvent via molecular sieves, dialysis, serum replacement, or other separation techniques. In one embodiment of this invention, the final solids content of microspheres in the intermediate or transfer solvent range from about 0.03 vol % to about 0.2 vol %.

The spherical particles dispersed in the intermediate solvent are subsequently mixed with the matrix-forming material. Throughout this and all transfer steps, particular measures are taken to prevent particle agglomeration, including: mild mixing, low temperature, and the use of stabilizers as previously described. The intermediate solvent is then removed from the solvent/prepolymer mixture via separation techniques like those described above.

A wide variety of materials with a broad range of mechanical properties can be used to form the elastic matrix. Although the choice of prepolymer starting material is not critical, it should be chosen such that the polymer matrix formed therefrom remains elastic at high elongations, greater than about 400%, and at high temperatures, ranging from about 40° C. to about 300° C. Moreover, while the elastic properties of the polymer matrix and the particles should be similar, the polymer matrix must be chemically distinct from the spherical polymer particles. The matrix should also be chosen such that the particles remain stable (unaggregated) in the prepolymer suspension or the polymeric matrix. Suitable elastomeric materials for use in this invention include materials which are hydrocarbon, fluorocarbon, or silicon in nature. Representative compounds are polybutadiene, polyisoprene, polysiloxanes, hexafluoropropylene-vinylidene fluoride copolymers, chlorotrifluoroethylene-vinylidene fluoride copolymers, chlorosulfonated polyethylene, polysulfides, polyvinylalcohol, polychloroprene, styrene-butadiene rubber, isobutene-isoprene copolymer and nitrile rubbers.

The matrix-forming prepolymer is subsequently polymerized and crosslinked to form an elastic matrix. To achieve this result, an appropriate initiator or catalyst is selected depending, of course, on the nature of the prepolymer material. Suitable initiators and catalysts include sodium hydroxide, sodium methoxide, methanol, carboxylic acid salts of zinc, iron, or tin, benzoyl peroxide, platinum, chloroplatinic acid, sulfuric acid, cumene hydroperoxide, alkyllithium, and tertiary amines. Moisture is all that is needed to initiate polymerization of water reactive prepolymer materials. The time necessary to complete polymerization ranges from about 2 hours to about 5 days.

A variety of bifunctional or polyfunctional monomers can be used to crosslink and to endlink the matrix-forming material. This crosslinking step may take place simultaneously with or following the polymerization of the matrix-forming material. Such monomers are often added in concentrations ranging from about 20% to about 50% in excess of the nominal concentrations stoichiometrically needed to tie up all of the reactive chain ends. For ease of mixing, such monomers should be incorporated into the original prepolymer material. Representative monomer compounds are formaldehyde, glutaraldehyde, amino alcohols, peroxides, diisocyanates, triisocyanates, diols, polyols, diamines, polyamines, tetramethyldisiloxane, silicon tetraacetate, methyltriethoxylsilane, methylhydrocyclosiloxanes, and sulfur. The ratio of tri-, tetra-, or poly- functional monomers to difunctional monomors strongly affects the network structure and hence the elastomeric properties of the matrix.

The particle/elastic matrix composite material thus formed is subsequently postcured if determined to be necessary for optimization of its elastic properties. The particle/matrix composite material is cut into strips of varying lengths and widths. The lengths and widths of such strips generally range from about 1 cm to about 20 cm.

The composite strips are thereafter heated to temperatures that exceed the glass-to-rubber transition temperature or the melting point of the particles to ensure that both the particles and the matrix are in the rubbery state. These temperatures generally range from about 40° C. to about 300° C., and preferably from about 100° C. to about 250° C.

The heated polymer particle/matrix composite strips are deformed isothermally. Deformation is accomplished by applying strains to the composite strips to cause their uniaxial or biaxial extension. To achieve such extensions, a standard tensile testing instrument such as an Instron Tensile Tester can be used. Such extensions or elongations can range up to about 400%.

The aspect ratios (length to diameter ratios) of the deformed particles embedded in the elastic polymer matrix are controlled by controlling the strains. Particles produced by the present invention have aspect ratios of maximum to minimum dimensions from about 1 to about 20.

The extended composite strips are subsequently cooled to room temperature while constraining the composite specimen in its deformed state, thereby 'freezing' the particles in their deformed or nonspherical state. The polymer particle/matrix composite is removed from the apparatus employed to perform the deformation. At this point, nonspherical particles such as prolate or oblate spheroids or nonaxisymmetric particles such as ellipsoids (depending on the nature of the applied strains) are embedded in the polymer matrix.

The particles are then separated from the elastic matrix and transferred to another medium for characterization. To accomplish that, the particles are dislodged from the elastomeric matrix by depolymerizing or otherwise chemically degrading or simply dissolving the elastic polymeric matrix. The medium used for that purpose must be so chosen that it only affects the polymer matrix and does not chemically or physically attack the embedded particles. The medium should be further chosen such that it dissolves or is miscible with the matrix degradation products. A variety of solutions can be used to simply dissolve the matrix polymer or to de-crosslink or to de-polymerize the polymer matrix or to otherwise degrade the matrix. Suitable solutions are aqueous and alcoholic solutions of hydrofluoric, sulfuric, or periodic acids, sodium hypochlorite and hydrogen peroxide, alcoholic solutions of sodium hydroxide, potassium hydroxide, or sodium methoxide, butylamine in dimethylacetamide, perfluoroacetic acid, perchloric acid, acetic anhydride, acetyl tosylate, lithium iodide, triphenyldibromophosphorane, and lithium diethylamide. Alcoholic solutions can be prepared from low molecular weight aliphatic alcohols such as methanol, ethanol, n-propyl alcohol or isopropyl alcohol. The selection of a depolymerizing solution depends on relative chemical characteristics of the spherical particles and the matrix polymer. The matrix degradation and removal process should proceed as a single phase system to avoid particle agglomeration.

Following the matrix removal step, the resulting particles are transferred to a solvent for subsequent recovery and/or characterization. To achieve this result, any of the solvent transfer methods described earlier may be used.

The resulting particles produced by the method of this invention will be prolate, oblate, or ellipsoidal in shape, depending upon whether a uniaxial, equal biaxial, or unequal biaxial deformation is used, respectively. The length-to-diameter ratios are controlled by the magnitudes of the applied strains. The volume of such particles is controlled by the size of the spherical polymer particles that are initially embedded in the elastomeric matrix. When the particle diameters of these spherical particles are monodisperse, the resulting prolate spheroids, oblate spheroids, or ellipsoids will also be monodisperse.

Figure 6:
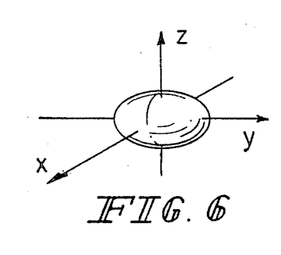
FIG. 6 is a perspective view of an oblate spheroidal particle.
Figure 7:
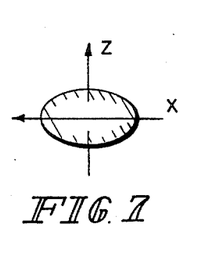
FIG. 7 is a transverse section through the z-z axis of FIG. 6.
Figure 8:
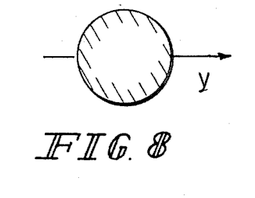
FIG. 8 is a transverse section through the y-y axis of FIG. 6.
Figures 10, 11, 13:
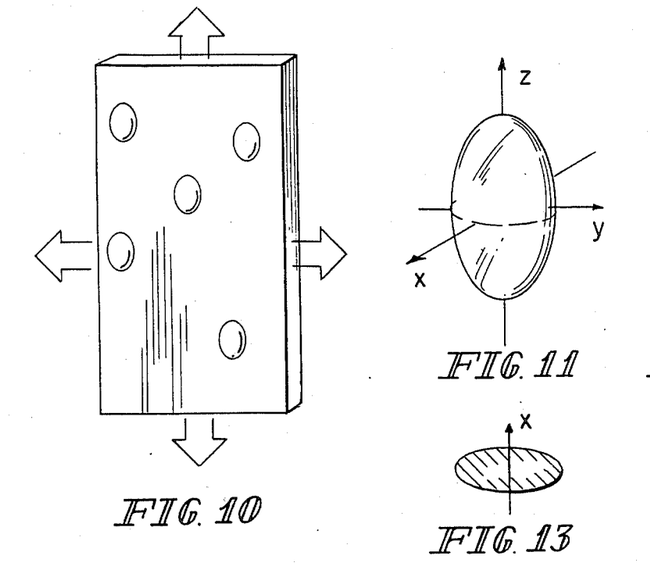
FIG. 10 is a perspective view showing the composite particle/matrix strip of FIG. 4 in unequal biaxial extension to produce elliposoidal particles.
FIG. 11 is a perspective view of an ellipsoidal particle.
FIG. 13 is a transverse section through the y-y axis of FIG. 11.
Figure 12:
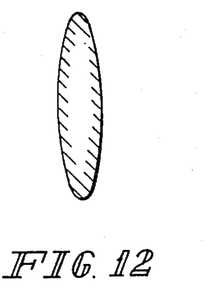
FIG. 12 is a transverse section through the z-z axis of FIG. 11.

In a preferred aspect of this invention, spheroidal and ellipsoidal polymer particles are produced. Perspective views of such spheroidal and ellipsoidal particles, as well as the Cartesian coordinate system for describing such particles, are shown in FIGS. 1, 6, and 11.

Figures 1, 2:
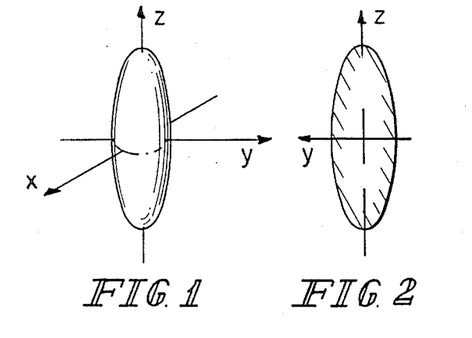
FIG. 1 is a perspective view of a prolate spheroidal particle.
FIG. 2 is a transverse section through the z-z axis of FIG. 1.
Figure 3:
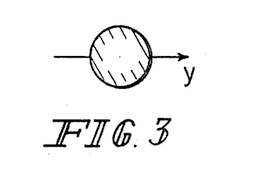
FIG. 3 is a transverse section through the y-y axis of FIG. 2.

A perspective view of a prolate spheroidal particle is shown in FIG. 1. A prolate spheroid is a degenerate ellipsoid, in which the particle dimension 'a' equals dimension 'b' and both dimensions are less than the particle length 'c'. The equation for the surface of a prolate spheroid is:

$$x^2/a^2 + y^2/b^2 + z^2/c^2 = 1$$

where $a = b < c$.

Figures 4, 5:
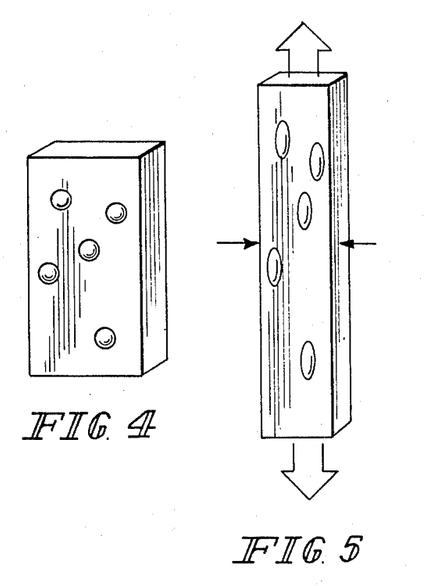
FIG. 4 is a perspective view of a particle matrix composite strip.
FIG. 5 is a perspective view showing the particle/matrix composite strip of FIG. 4 in uniaxial extension to produce prolate spheroidal particles.

As shown in FIGS. 1-5, in one embodiment of this invention, prolate spheroids are produced by uniaxial extension of a composite strip of polymer matrix embedded with spherical polymer particles. As shown in FIG. 5, uniaxial extension of the composite strip is produced by placing the composite strip in a standard tensile testing instrument such as an Instron Tensile Tester and extending the strip in the directions of the double arrows. Because both the polymer particles and the polymer matrix are in a rubbery state at the deformation temperature, the polymer particle/matrix system will be essentially incompressible. Consequently, the lateral strain, $\epsilon_l$, is equal to and of opposite sign to $(1+\epsilon_a)^{-\frac{1}{2}} - 1$, where $\epsilon_a$ is the axial strain. The aspect ratio (c/a) of the prolate spheroids equals $(1+\epsilon_l)^{3/2}$. Perspective views of the prolate spheroids produced by the uniaxial extension of a composite particle/matrix strip are shown in FIGS. 1 and 5.

In another embodiment of this invention, an oblate spheroid is produced. A perspective view of an oblate spheroid produced according to the method of this invention is shown in FIG. 6. An oblate spheroid is another degenerate ellipsoid. The surface equation for an oblate spheroid is:

$$x^2/a^2 + y^2/b^2 + z^2/c^2 = 1$$

where $a = b > c$.

Figure 9:
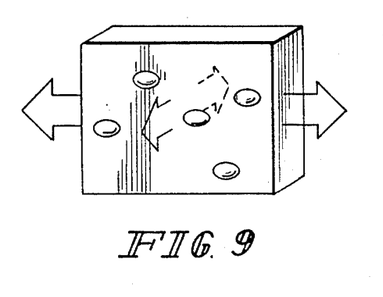
FIG. 9 is a perspective view showing the composite particle/matrix strip of FIG. 4 in equal biaxial extension to produce oblate spheroidal particles.

Referring now to FIGS. 6-9, oblate spheroids are produced by equal biaxial extension of the composite strip shown in FIG. 4. Equal biaxial extension can be produced in a biaxial deformation apparatus such as that employed by L. R. G. Treloar in *Proc. Phys. Soc.*, 60, 135 (1948). Because both the polymer particles and the elastomeric matrix are in the rubbery state at the deformation temperature, the polymer particle/matrix composite system will be incompressible. Consequently, the transverse strain, $\epsilon_3$, is equal to $(1+\epsilon_1)^{-\frac{1}{2}}-1$, where $\epsilon_1$ is the applied planar strain. The aspect ratio (c/a) of the oblate spheroids equals $(1+\epsilon_1)^{-3/2}$ and is less than one. A perspective view of the oblate spheroids obtained by the equal biaxial extension of a composite strip produced in accordance with the present invention is shown in FIG. 9.

Referring now to FIGS. 10-13, yet another preferred aspect of this invention, the production of an ellipsoidal particle, is shown. The equation of the surface of the ellipsoid in this coordinate system is:

$$x^2/a^2 + y^2/b^2 + z^2/c^2 = 1$$

where $a \neq b \neq c$. Specifically, when one is looking down the a-axis of the ellipsoid, the projected image is an ellipse of length $2c$ and width $2b$; when looking down the y-axis, the projected image is an ellipse of length $2c$ and width $2a$; and down the z-axis, the projected image is an ellipse of length $2b$ and width $2a$.

As shown in FIG. 10, ellipsoids are produced by inducing unequal biaxial extension of the particle/matrix composite strip of FIG. 4. Unequal biaxial extension can be produced in the same type of apparatus that is used to produce the equal biaxial extension. Because both the polymer particles and the polymer matrix are in the rubbery state at the deformation temperature, the composite system will be practically incompressible. Consequently, the tertiary strain $\epsilon_3$ is equal to $(1+\epsilon_1)^{-1 \times}(1+\epsilon_2)^{-1}-1$, where $\epsilon_1$ and $\epsilon_2$ are the primary and secondary strains applied to the composite strip. The aspect ratio c/b for the ellipsoid is equal to $(1+\epsilon_1)/(1+\epsilon_2)$, while the aspect ratio b/a is equal to $(1+\epsilon_2)/(1+\epsilon_3)$. The two ellipsoid aspect ratios are greater than one. A perspective view of the ellipsoids produced by the unequal biaxial deformation of a composite strip is shown in FIG. 11.

The well-characterized nonspherical microparticles produced by the method of this invention may be advantageously employed in various ways. For example, spheroidal and ellipsoidal particles can be used as model particles for a variety of scientific studies. Specifically, prolate spheroids, oblate spheroids, and ellipsoids are the simplest geometric shapes other than a sphere and have been employed in numerous theoretical descriptions concerning dispersion rheology, light scattering, microelectrophoresis, statistical thermodynamics, size-exclusion and hydrodynamic chromatography, fluid mechanics, colloidal stability, and protein physical chemistry. To date, however, there have been no particles available to test these theories. The availability of microparticulate prolate spheroids, oblate spheroids, ellipsoids, and other nonspherical-shaped particles will therefore permit the experimental testing of these scientifically important theories.

A second application for which the present invention can be used is as standards for instrument calibration. Monodisperse spherical polymer particles are currently employed as calibration standards for electron microscopes as well as for instruments utilized in studying light scattering and chromatography. Monodispersity in both the size and shape of the polymer particles is very important in these applications. Such instruments cannot, however, be calibrated for varying shape effects with the use of spherical particles. The prolate spheroids, oblate spheroids, and ellipsoids described in this invention will, therefore, be valuable as calibration standards for determining size and shape.

Yet another application of the present invention includes the production of anisotropic composite materials having controlled anistropy in their optical, thermal, magnetic, electrical, or mechanical properties. Monodispersity and nonsphericity will be useful for the control of such properties in materials. Magnetic particles can be used in memory devices and other high technology applications.

The spheroidal and ellipsoidal microparticles produced by the method of this invention may also be useful in many various biomedical applications. For example, polymer particles are used to diagnose and to control infectuous diseases and in cancer cell separations. Treleaven et al., *Magnetic Separation News*, 1, 103 (1984). Monodisperse polymer particles are further used to study lupus and allergies and to aid in the detection of other medical problems.

The following example illustrates the application of the present invention to a polyvinyltoluene latex dispersed in an elastomeric matrix of poly(dimethylsiloxane). This example is given only for the purpose of illustration and is not to be construed as limiting the invention in any way.

EXAMPLE 1

Monodisperse microspheroids with controlled size and shape were produced by combining polyvinyltoluene (PVT) microspheres in an elastomeric silicone matrix and deforming the microspheres in the following manner.

Monodisperse PVT microspheres manufactured by Dow Chemical Co., were used as the starting material. The microspheres had an average diameter of 2.02 microns and were supplied as aqueous suspensions (latex) containing 10% solids by weight. Isopropanol (IPA) was used as an intermediate solvent for transfer of the microsphere particles to the prepolymer mixture. The aqueous suspension of PVT particles was added directly to the IPA. To ensure that the transfer proceeded as a single phase, residual water was removed from the PVT/IPA dispersion via drying over Linde Type 4A molecular sieves. The final solids content of the dry PVT/IPA dispersion was 0.1 vol %.

The elastomeric matrix was formed from poly(dimethylsiloxane) (PDMS) prepolymers. The PDMS prepolymers, supplied by Petrarch Systems, were silanol terminated and had a viscosity average molecular weight of 36,000 g/mol. The PVT/IPA dispersion was blended with the PDMS fluid matrix in a volume ratio of 1 to 3.

The IPA was removed from the prepolymer/microsphere dispersion medium by evaporating the IPA during agitation. Residual IPA was removed by evaporation under vacuum. The removal was complete in eight hours.

To attain the desired elastic properties, the PDMS prepolymer was first chain-extended with a difunctional endlinking agent, dimethylsiloxane in a molar ratio of 1:1.2. The PDMS was then crosslinked with 120 mol % methyltriethoxysilane (MTES) (based on the total amount of PDMS) and 0.5 wt % tin octoate catalyst used to initiate the polymerization reaction. The reaction mixture was thoroughly mixed and poured into a 4"×7" TEFLON (tetrafluorethylene) polymerization mold. Polymerization was carried out at room temperature for four days. The composite particle/matrix material was subsequently postcured at 150° C. for 4 to 24 hours. FLUOROGLIDE TEFLON (tetrafluorethylene) spray, from Chemplast, was used as a mold release agent.

Figure 14:
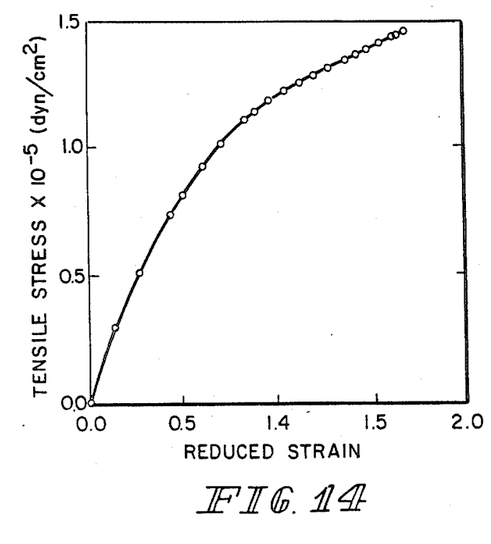
FIG. 14 illustrates the Stress-Strain Curve for deformation producing PVT particles A deformed at 155° C.
Figure 15:
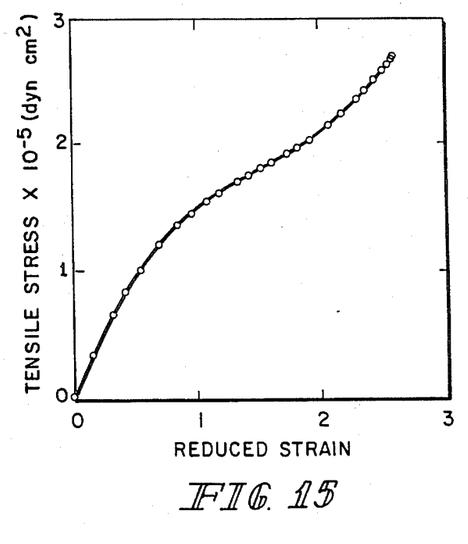
FIG. 15 illustrates the Stress-Strain Curve for deformation producing PVT particles B deformed at 155° C.

Two strips, Strip A and Strip B, of this composite material (1.5 cm×15 cm) were cut and then deformed at 150° C. by a uniaxial extension to produce monodisperse deformed particles. Each strip was placed in an Instron universal testing instrument (Model TTC) and heated to 155° C. Strip A was uniaxially deformed by a uniaxial extension of 95%. Strip B was uniaxially extended 170%. Deformed Strips A and B were kept under tension while the samples were cooled to 50° C. Stress-strain curves for the deformations that produced these particles are presented in FIGS. 14 and 15, respectively.

Figure 16:
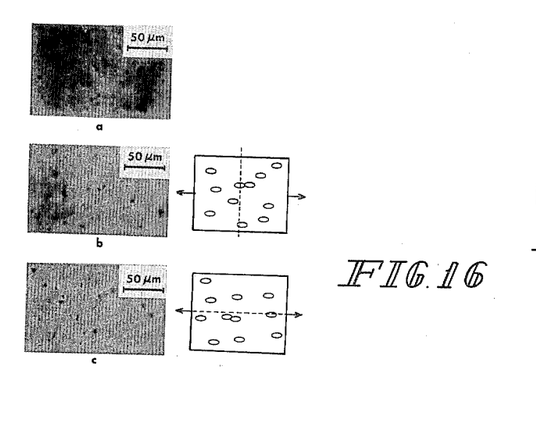
FIG. 16 is a light micrograph of PVT particles produced by a uniaxial extension of Strip A.
Figure 17:
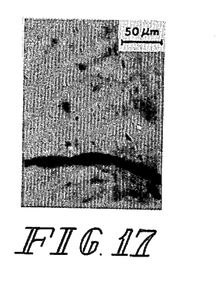
FIG. 17 is a light micrograph of PVT particles produced by a uniaxial extension of Strip B and viewed parallel to the axis of deformation.

Paper-thin specimens from Strips A and B were cut and observed in a light microscope. FIGS. 16 and 17 show particles from Strips A and B, respectively, both before and after deformation. Before deformation, the particles were spherical, having a circular cross-section when viewed from different angles. The particles also were unagglomerated and quite uniform (FIGS. 16a and 17). After uniaxial extension of 95% at 155° C., a light micrograph taken perpendicular to the direction of the deformation showed particles with a circular cross-section (FIG. 16b), while a micrograph taken parallel to the direction of the deformation showed an elliptical cross-section (FIG. 16c). A light micrograph of the particles from specimen B is shown in FIG. 17.

The PDMS matrix was subsequently degraded and dissolved with a 1M solution of sodium methoxide in ethanol. The dissolution was carried out at room temperature for 40 hours. The resulting microspheroids were isolated by centrifugation and redispersed in IPA for characterization.

Figure 18A:
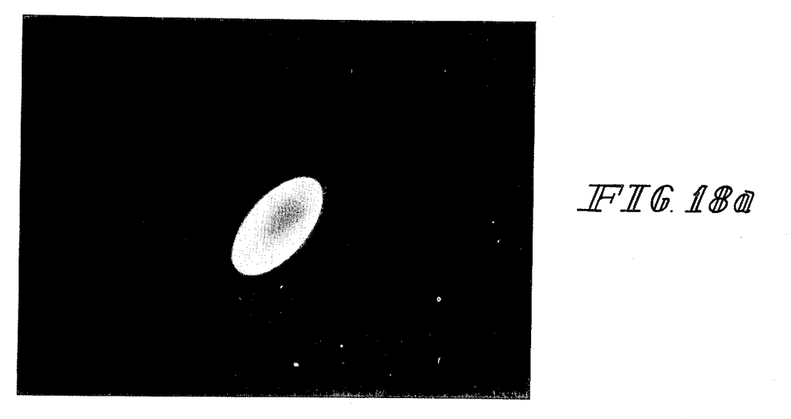
FIG. 18 is a scanning electron micrograph of PVT prolate microspheroids produced from Strip A having an aspect ratio of 2.0 and a volume of 4.3 cubic microns.
Figure 18B:
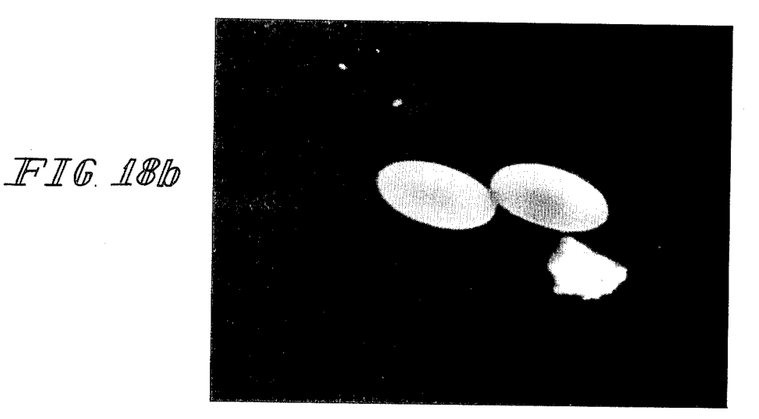

Scanning electron micrographs of typical microspheroidal particles from Strip A are shown in FIG. 18a and FIG. 18b. FIG. 18a shows a single microspheroid and FIG. 18b shows a doublet. The resulting particles were microspheroids having a volume of 4.3 cubic microns, an average length of 3.60 microns, an average diameter of 1.80 microns, and an aspect ratio of 2.0. This compares with the expected aspect ratio of 2.7. The particles were exceptionally monodisperse in size and shape with deviations in the length and diameter of less than ±3.0%. The particles further agreed with the shape of prolate spheroids to within ±3.7%.

Figure 19A:
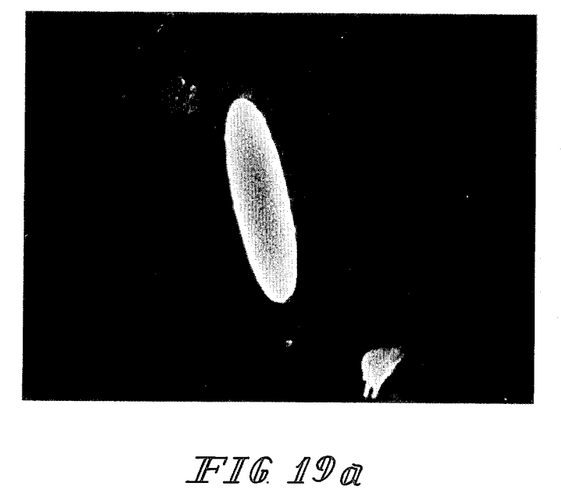
FIG. 19 is a scanning electron micrograph of PVT prolate microspheroids produced from Strip B having an aspect ratio of 3.7 and a volume of 4.3 cubic microns.
Figure 19B:
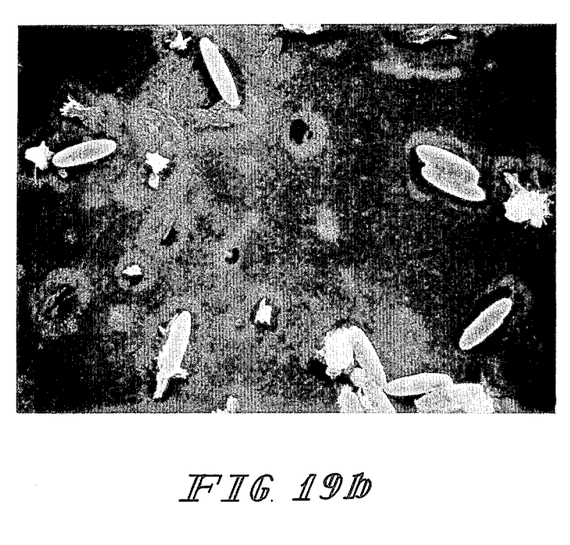

A scanning electron micrograph of typical microspheroidal particles from Strip B is shown in FIG. 19. The particles from Strip B were also microspheroids having a volume of 4.3 cubic microns, an average length of 5.5 microns, an average diameter of 1.5 microns, and an aspect ratio of 3.7. This compares with an expected aspect ratio of 4.4. Deviations in the length and diameter of the particles from Strip B were less than ±7%. The particle shapes agreed with that of a prolate spheroid to within ±4.7%. The deviations in particle dimensions may have been due to the particles being deposited on the microscope block at different angles.

These micrographs demonstrate that monodisperse microspheroids with controlled size and shape can be produced in accordance with this invention.

While we have described the invention with respect to specific materials, operating conditions, and procedures, such are illustrative only. Numerous modifications and equivalents will be apparent to those of ordinary skill in this art without departing from the spirit of the invention.

What is claimed is:

1. A method for producing nonspherical polymer particles which comprises:

dispersing spherical particles of a polymeric material having a glass-to-rubber transition temperature or melting point significantly greater than room temperature into a second material capable of forming a polymer matrix, said polymeric material and said polymer matrix having dissimilar chemical properties:

forming the dispersion of spherical particles into a shape and polymerizing the matrix-forming material to form a shaped particle/matrix composite material comprising the spherical particles embedded in an elastic polymer matrix;

heating the particle/matrix composite material to a temperature greater than the glass-to-rubber transition temperature or melting temperature of the spherical particles;

applying an axial strain to axially extend the heated particle/matrix composite material to form nonspherical particles in the extended matrix composite;

cooling the composite material while maintaining the composite material in its axially extended condition;

treating the composite material with an elastic polymer dissolution medium to selectively effect dissolution of the elastic polymer matrix and release of the nonspherical particles; and recovering said nonspherical particles from said dissolution medium.

2. The method of claim 1 wherein the polymeric material is selected from the group consisting of polystyrene, polyvinyltoluene, polyacrylonitrile, polyvinylesters, polydivinylbenzene, polyvinylalcohol, polymethylmethacrylate, and polyethylmethacrylate and copolymers thereof.

3. The method of claim 1 wherein said nonspherical polymer particles are monodisperse.

4. The method of claim 1 wherein the polymeric material is polyvinyltoluene.

5. The method of claim 1 wherein the polymeric material is polystyrene.

6. The method of claim 1 wherein such spherical particles have an average diameter of about 0.01 microns to about 100 microns.

7. The method of claim 1 wherein a uniaxial extensional strain is applied to the particle/matrix composite material to form prolate spheroids.

8. The method of claim 1 wherein equal biaxial strains are applied to the particle/matrix composite material to form oblate spheroids.

9. The method of claim 1 wherein unequal biaxial strains are applied to the particle/matrix composite material to form nonaxisymmetric particles.

10. The method of claim 1 wherein unequal biaxial strains are applied to the particle/matrix composite material to form ellipsoids.

11. The nonspherical particles prepared in accordance with the method of claim 1.

12. The nonspherical particles prepared in accordance with the method of claim 7.

13. The nonspherical particles prepared in accordance with the method of claim 8.

14. The nonspherical particles prepared in accordance with the method of claim 9.

15. The nonspherical particles prepared in accordance with the method of claim 10.

16. The method of claim 1 wherein the matrix-forming material is polydimethylsiloxane, having a molecular weight ranging from about 17,000 to about 58,000.

17. The method of claim 16 wherein the polydimethylsiloxane is crosslinked with methyltriethoxysilane, the proportion of methyltriethoxysilane to such polydimethylsiloxane being at least about 20% in excess of the stoichiometric quantity necessary for complete polymerization of the polydimethylsiloxane.

18. The method of claim 17 wherein the particle/matrix composite material is heated to a temperature ranging from about 140° C. to about 170° C.

19. The method of claim 18 wherein a uniaxial extensional strain is applied to the particle/matrix composite material to form prolate spheroidal particles.

20. The method of claim 19 wherein the elastic polymer dissolution medium is a 1M solution of sodium methoxide in ethanol.

21. A method for producing polymeric microparticles having a prolate spheroidal shape which method comprises:
dispersing spherical particles of a polymeric material having a glass-to-rubber transition temperature or melting point above room temperature into a second material capable of forming an elastic polymer matrix, said elastic polymer matrix and said polymeric material having similar elastic properties but dissimilar chemical properties;
forming the dispersion of spherical particles into a shape and reacting the matrix-forming material with a crosslinking reagent to form a shaped particle/matrix composite material comprising an elastic polymer matrix surrounding the spherical particles;
cutting the particle/matrix material into strips;
heating the strips to a temperature greater than the glass-to-rubber transition temperature, or melting point of said spherical particles;
applying a uniaxial strain to the strips to uniaxially extend the strip and the spherical polymer particles surrounded by the polymer matrix;
cooling the strips while maintaining the strips uniaxially extended;
treating the strips to selectively effect dissolution of the elastic polymer matrix and release of the particles; and
separating and recovering said particles from the chemical degradation medium, whereby prolate spheroidal particles are obtained.

22. A method for producing polymeric microparticles having an oblate spheroidal shape which method comprises:
dispersing spherical particles of a polymeric material having a glass-to-rubber transition temperature or melting point above room temperature into a second material capable of forming an elastic polymer matrix, said elastic polymer matrix and said polymeric material having similar elastic properties but dissimilar chemical properties;
forming the dispersion of spherical particles into a shape and reacting the matrix-forming material with a crosslinking reagent to form a shaped particle/matrix composite material comprising an elastic polymer matrix surrounding the spherical particles;
cutting the particle/matrix material into strips;
heating the strips to a temperature greater than the glass-to-rubber transition temperature or melting point of said spherical particles;
applying an equal biaxial strain to the strips to biaxially extend the strip and the spherical polymer particles surrounded by the polymer matrix;
cooling the strips while maintaining the strips biaxially extended;
treating the strips to selectively effect dissolution of the elastic polymer matrix and release of the particles; and
separating and recovering said particles from the chemical degradation medium, whereby oblate spheroid particles are obtained.

23. A method for producing polymeric monodisperse microparticles having an ellipsoidal shape which method comprises:
dispersing spherical particles of a polymeric material having a glass-to-rubber transition temperature or melting point above room temperature into a second material capable of forming an elastic polymer matrix, said elastic polymer matrix and said polymeric material having similar elastic properties but dissimilar chemical properties;
forming the dispersion of spherical particles into a shape and reacting the matrix-forming material with a crosslinking reagent to form a shaped particle/matrix composite material comprising an elastic polymer matrix surrounding the spherical particles;
cutting the particle/matrix composite material into strips;
heating the strips to a temperature greater than the glass-to-rubber transition temperature or melting point of said spherical particles;
applying an unequal biaxial strain to the strips to biaxially extend the strip and the spherical polymer particles surrounded by the polymer matrix;
cooling the strips while maintaining the strips biaxially extended;
treating the strips to selectively effect dissolution of the elastic polymer matrix and release of the particles; and
separating and recovering said particles from the chemical degradation medium, whereby ellipsoidal particles are obtained.

24. The prolate spheroidal particles prepared in accordance with claim 21.

25. The oblate spheroidal particles prepared in accordance with claim 22.

26. The ellipsoidal particles prepared in accordance with claim 23.

* * * * *